United States Patent
Srivastava et al.

(10) Patent No.: US 6,602,002 B1
(45) Date of Patent: Aug. 5, 2003

(54) HIGH CAPACITY OPTICAL TRANSMISSION ARRANGEMENT

(75) Inventors: Atul Kumar Srivastava, Eatontown, NJ (US); James William Sulhoff, Ocean, NJ (US); Yan Sun, Middletown, NJ (US); John Lehrer Zyskind, Hummelstown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,279

(22) Filed: Feb. 19, 1999

Related U.S. Application Data

(60) Provisional application No. 60/075,296, filed on Feb. 20, 1998.

(51) Int. Cl.⁷ .............................. H04B 10/00
(52) U.S. Cl. .................... 398/113; 398/160; 398/87; 398/97; 398/180; 359/337.21; 359/349
(58) Field of Search ................... 359/173, 341.1, 359/122, 349, 133, 134, 341.32, 341.33, 337.21; 385/37

(56) References Cited

U.S. PATENT DOCUMENTS

| | | | | |
|---|---|---|---|---|
| 5,392,154 A | * | 2/1995 | Chang et al. | 359/341 |
| 5,452,116 A | * | 9/1995 | Kirkby et al. | 359/124 |
| 5,694,408 A | * | 12/1997 | Bott et al. | 372/6 |
| 5,801,858 A | * | 9/1998 | Roberts et al. | 359/114 |
| 5,812,306 A | * | 9/1998 | Mizrahi | 359/143 |
| 5,905,838 A | * | 5/1999 | Judy et al. | 359/109 |
| 5,909,294 A | * | 6/1999 | Doerr et al. | 359/114 |
| 5,978,130 A | * | 11/1999 | Fee et al. | 359/341.32 |
| 5,986,800 A | * | 11/1999 | Kosaka | 359/341 |
| 6,049,417 A | * | 4/2000 | Srivastava et al. | 359/337.4 |
| 6,049,418 A | * | 4/2000 | Srivastava et al. | 359/337.4 |
| 6,104,527 A | * | 8/2000 | Yang | 359/341.33 |
| 6,134,033 A | * | 10/2000 | Bergano et al. | 359/122 |
| 6,137,604 A | * | 10/2000 | Bergano | 359/124 |

* cited by examiner

Primary Examiner—Leslie Pascal
Assistant Examiner—David C Payne

(57) ABSTRACT

A high-capacity optical transmission arrangement utilizing a plurality of laser sources and a plurality of wide-band optical amplifiers permit the reliable transmission of 1 Tb/sec rates over significant distances of optical fiber.

2 Claims, 9 Drawing Sheets

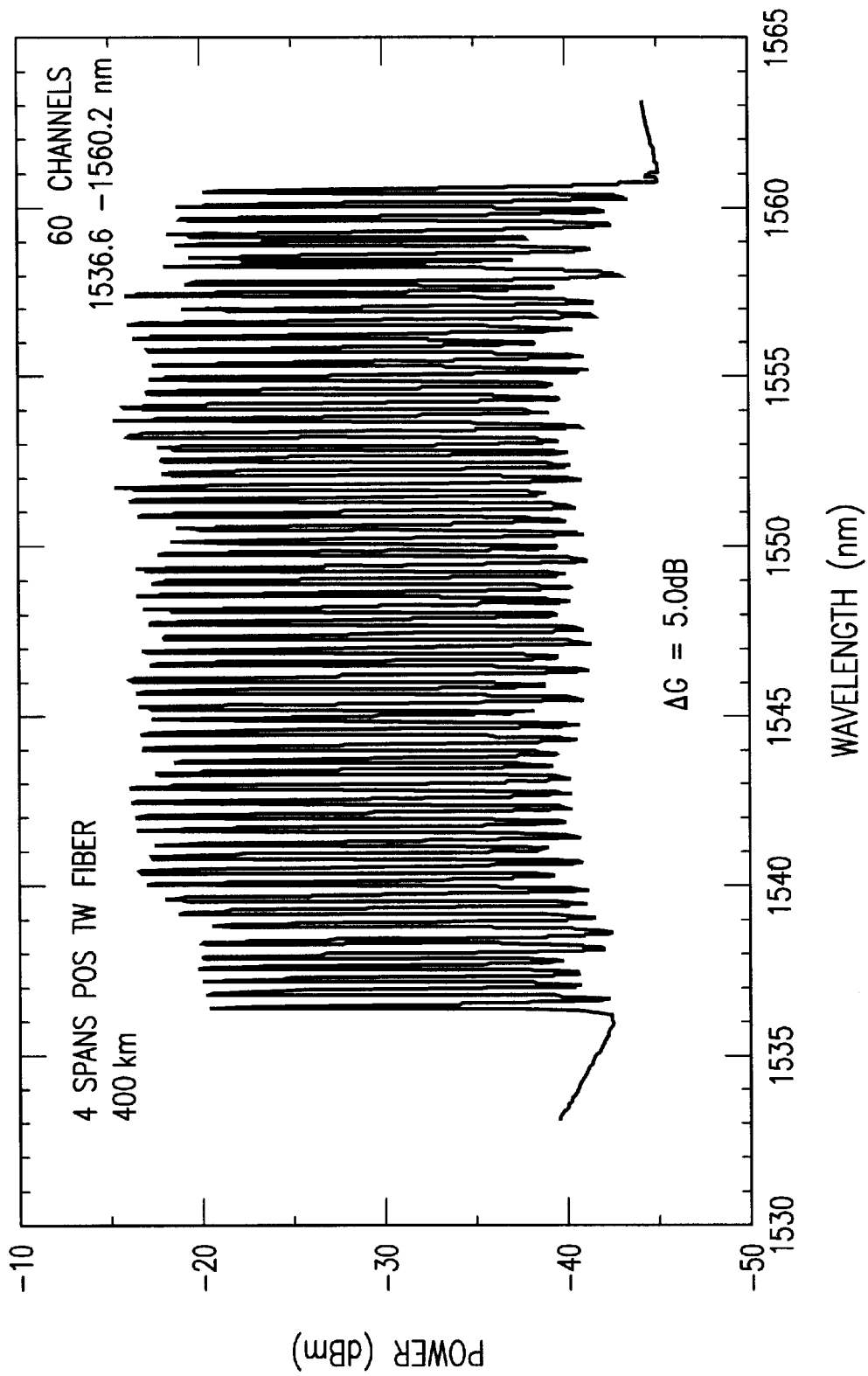

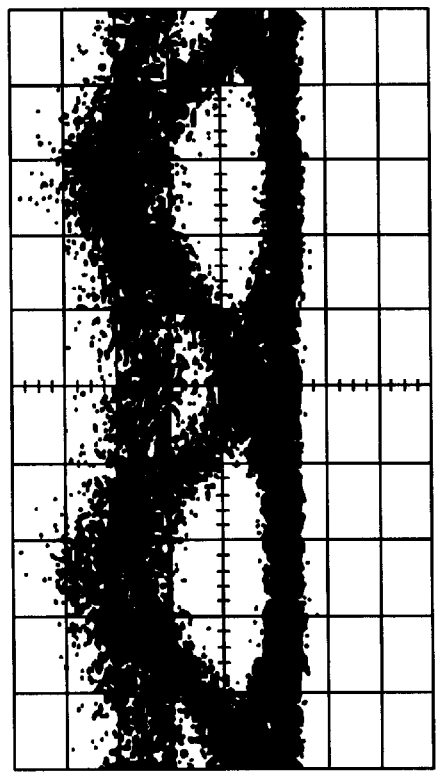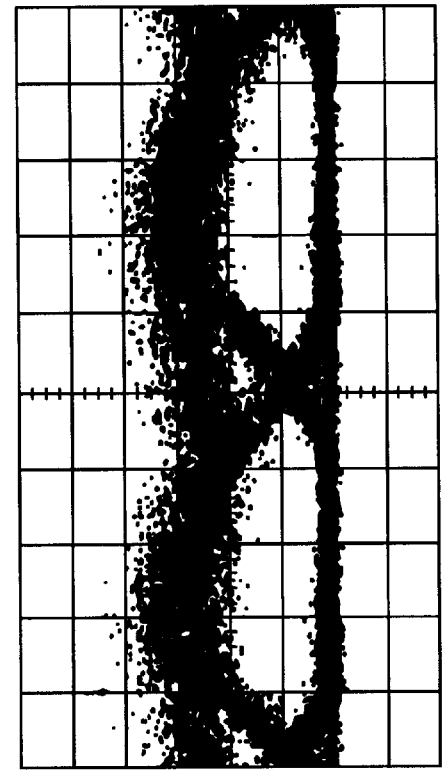
FIG. 5
1 Tb/s OVER 400km TW FIBER
CHANNEL 90
CHANNEL 24

US 6,602,002 B1

HIGH CAPACITY OPTICAL TRANSMISSION ARRANGEMENT

CROSS REFERENCE TO RELATED APPLICATIONS

This application claims the benefit of U.S. Provisional Application No. 60/075,296 filed Feb. 20, 1998 and is incorporated herein by reference.

FIELD OF THE INVENTION

The present invention relates generally to the field of optical communications and in particular to a high capacity, dense wavelength-division-multiplexed (DWDM) transmission arrangement.

BACKGROUND OF THE INVENTION

The capacity of dense wavelength division multiplexed optical fiber communication systems is expanding rapidly due, in large part, to the demand created by voluminous amounts of data traffic and the Internet. Long-haul commercial DWDM systems, which are generally based upon silica erbium-doped fiber amplifiers (EDFA's), are limited to a capacity of much less than 1 Tb/s due to the limited bandwidth of the EDFA's.

Experimental long-haul transmission exhibiting 32×10 Gb/s capacity using wide band silica EDFA's was reported by Y. Sun et al., in an article entitled "Transmission of 32-WDM 10 Gb/s Channels over 640 km using Broad-band, Gain-Flattened Erbium-Doped Silica Fiber Amplifiers", that appeared in IEEE Photon. Technol. Lett., Vol. 9, No. 12, pp. 1652–1654 in 1997. The channel spacing for the arrangement was 100 GHz, which corresponds to an ITU standard. Subsequently, a transmission exhibiting 50×10 Gb/s capacity was reported by H. Tagu et al., in an article entitled "A half Tbits/s (50×10.66 Gb/s), over 1600 Km Transmission Experiment using Widely Gain-flattened EDFA Chain", at ECOC 97 in Edinburgh, UK, Paper PD, pp. 13–16, 1997. In that experiment, the spacing between amplifiers was 50 km—a much more suitable distance for such applications as trans-oceanic links. For terrestrial applications however, longer spans are preferable to further reduce the number of amplifiers in the transmission path.

Consequently, additional long distance transmission arrangements are desired.

SUMMARY OF THE INVENTION

We have developed a high-capacity optical transmission arrangement exhibiting 1 Tb/s transmission capacity. The arrangement comprises a plurality of optical sources and a plurality of wide-band optical amplifiers connected in series, wherein each individual amplifier includes a "split-band" architecture in which individual sub-bands of the optical energy traversing the amplifier are separated and then amplified in parallel prior to recombination and subsequent output.

Further features and advantages of the present invention, as well as the structure and operation of various embodiments of the present invention are described in detail below with reference to the accompanying drawing.

BRIEF DESCRIPTION OF THE DRAWING

FIG. 5 show "eye-diagrams" for channel 5 17 after transmission through our arrangement;

DETAILED DESCRIPTION OF THE INVENTION

Figure 1:
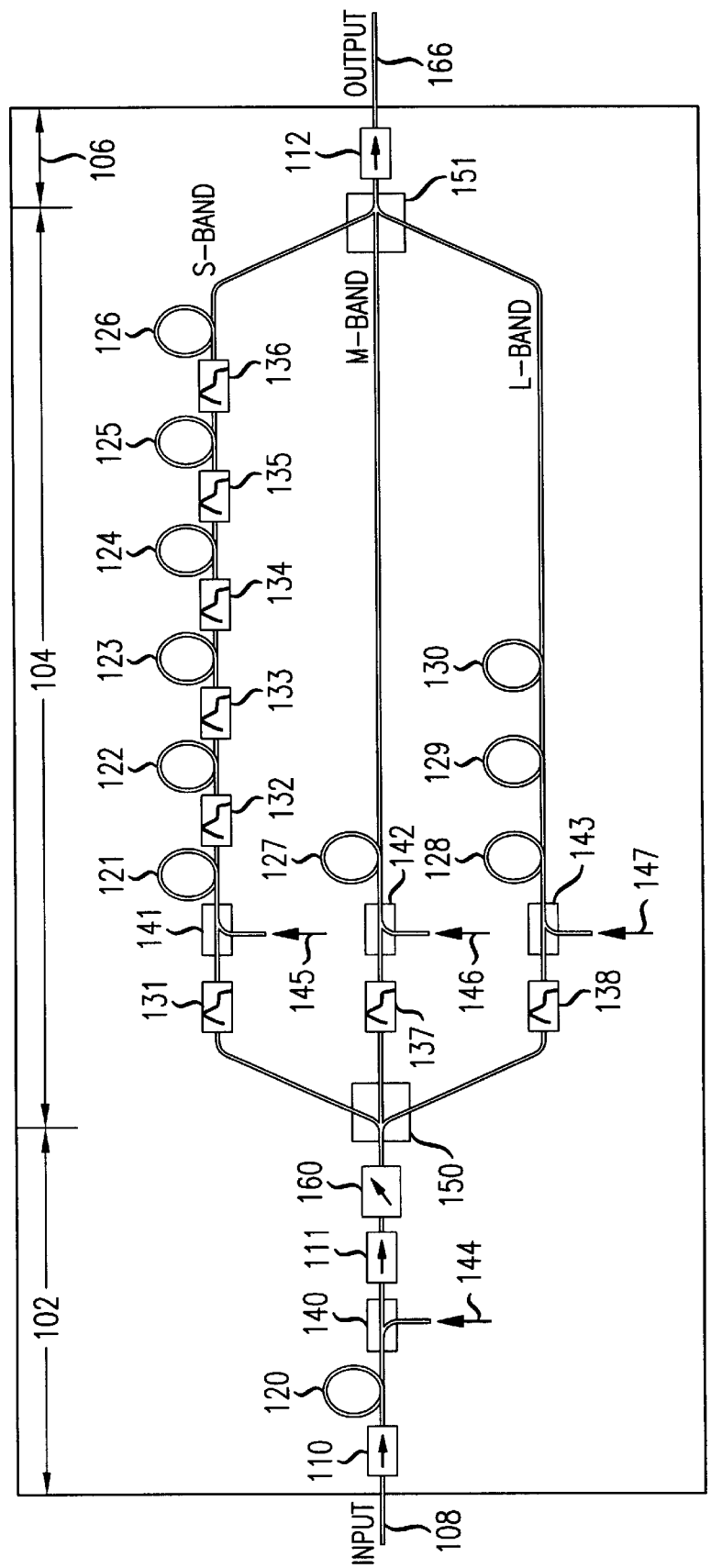
FIG. 1 is a schematic view of a wide band optical amplifier useful in the present inventive arrangement.

FIG. 1 illustrates the basic principle of our wide band, optical fiber amplifier that is used within our high-capacity transmission arrangement. The wide band amplifier shown there 100, is divided primarily into two sections namely, a first common section 102 and a second, split section 104. Briefly stated, optical signals enter the common section 102 of the wide band optical amplifier 100. The signals are then split into two (or more) independent bands and each of these independent bands is then directed into separate branches of the second, split section 104. In parallel, the independent bands may be amplified within these separate branches and then subsequently re-combined into an output signal. Optionally, the re-combined output signal may be further amplified or otherwise processed into output section 106.

Based upon this principle, a wide-band optical amplifier may be implemented. With continued reference to FIG. 1, optical signals enter the wide band optical amplifier 100 through input port 108 and exit from output port 166, with the output port 166 being "downstream" of the input port 108. Components 110–112 are optical isolators, 120–130 are erbium-doped amplifier fibers, 140–143 are wavelength-selective optical fiber couplers or "WDMs" for coupling pump radiation 144–147 into the amplifier fibers, 131–138 are gain equalization filters (GEFs), 160 is an attenuator, and 150–151 are a demultiplexer and a multiplexer, respectively. Optical isolators, attenuators, GEFs, WDMs, multiplexers, and demultiplexers are generally known, some of which are commercially available. Those skilled in the art know that it is conventional, but optional, to place optical isolators respectively upstream and downstream of an EDFA.

As can be seen from FIG. 1, all entering optical signals pass through the common section 102 where they may be amplified prior to splitting. In this exemplary structure, the signals are split into three sub-bands through the action of demultiplexer 150. More specifically, the signals are shown split into a short wavelength (S-band), a middle wavelength band (M-band—also known as the conventional or C-band) and a long wavelength band (L-band), each corresponding to a branch of the split section 104. As may now be apparent, this splitting of the optical signals into multiple bands permits the separate, parallel amplification of the bands.

Figure 7:
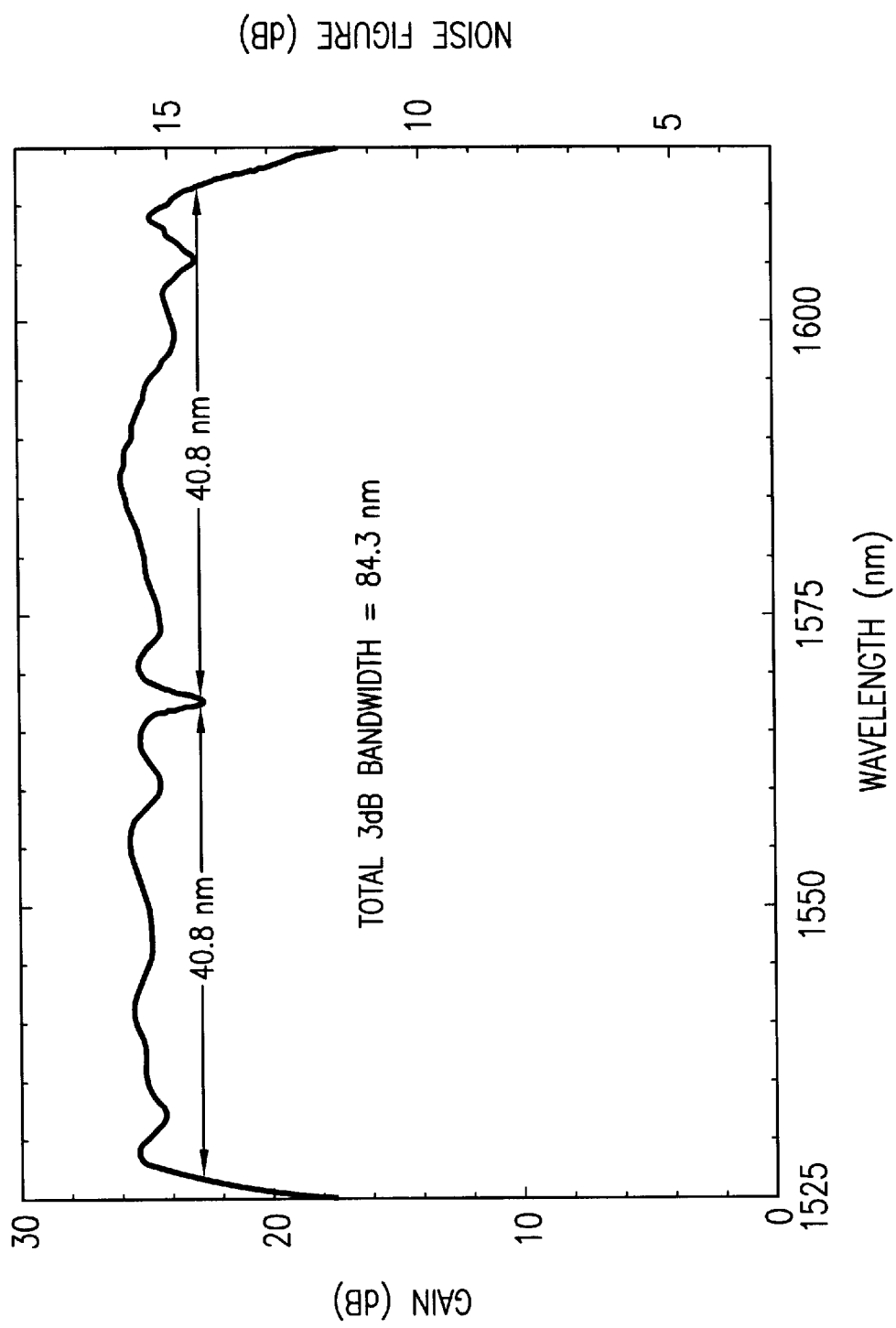
FIG. 7 is a graph of the gain spectrum of a single wide-band amplifier used in the present inventive arrangement.

One embodiment of inventive high-capacity transmission-arrangement utilizes such wide-band amplifiers. Specifically, a two-band wide-band amplifier having a C-band and a L-band, was used. The gain spectrum of the two-band, wide-band amplifier is shown in FIG. 7. The gain spectrum was flattened using long-period grating filters such as those described by A. M. Vengsarkar et al., in an article entitled "Long-period Fiber Gratings Based Gain Equalizers", that appeared in Opt. Lett., No. 21, pp 336 (1966).

Figure 8:
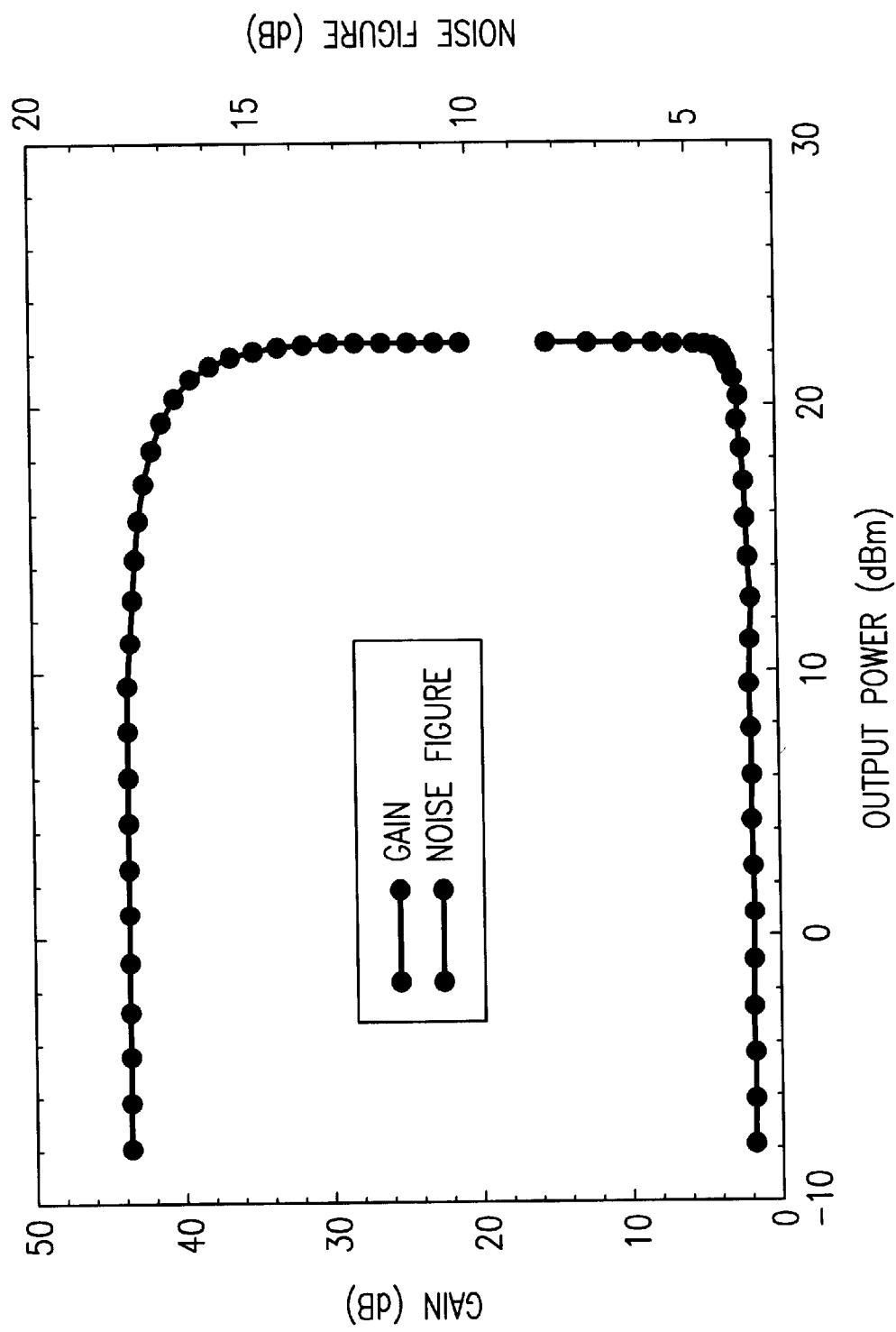
FIG. 8 is a graph showing the gain/noise figure for a wide-band amplifier with output power at 1554 nm.

As can be seen with reference to FIG. 8, the wide-band amplifier exhibits 3 dB bandwidth of 84.3 nm with 40.8 nm in C-band and 43.5 nm in L-band, respectively. With reference now to FIG. 8, there is shown a saturation curve at 1554 nm in the C-band for an individual gain-flattened erbium-doped fiber amplifier. The amplifiers had 25 dBm total output power and ~6 dB noise figure at a gain of 25 dB. The noise figure was 0.5 dB higher than in the C-band. The amplifier is designed to accommodate additional 8 dB loss in a middle section to incorporate dispersion compensation. Advantageously, the two band configuration as used in this arrangement allows different amounts of dispersion compensation in the two bands. Such difference is crucial for proper dispersion management over such a wide bandwidth.

Additionally, an attenuator, positioned in the mid-section of the amplifier may be adjusted to permit broadband, flat-gain operation for a wide range of gains, which is desirable to accommodate variations in span losses commonly encountered in practical transmission systems and multiwavelength optical networks.

Figure 2:
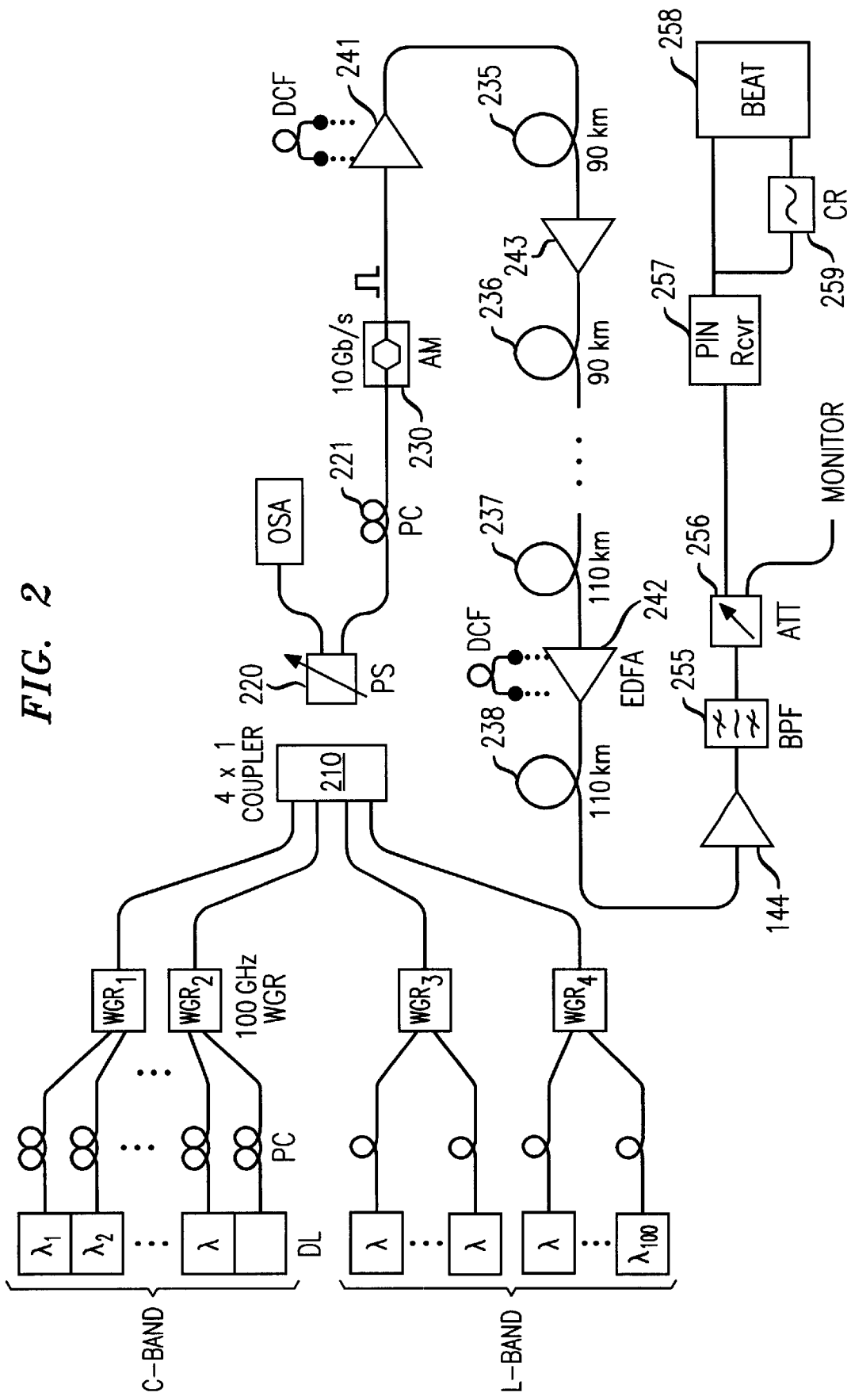
FIG. 2 is a schematic view of our exemplary wide-band transmission arrangement according to the present invention.

A representative embodiment of our high-capacity transmission system is shown schematically in FIG. 2. There, light output from 100 lasers $\lambda_1 \ldots \lambda_{100}$ were combined using four, 100-GHz waveguide grating routers $WGR_1 \ldots WGR_4$. Shown in this Figure, there are a total of 60 channels ($\lambda_1 \ldots \lambda_{60}$) in C-band frequencies, with odd numbered channels $\lambda_1, \lambda_3, \lambda_5 \ldots \lambda_{59}$ were multiplexed using one of the routers $WGR_1$, and the even numbered channels $\lambda_2, \lambda_4, \lambda_6, \ldots _{60}$ were multiplexed using another of the routers, $WGR_2$. The resulting two sets of channels, were interleaved and combined with 50 GHz spacing.

In L-band frequencies, 40 channels ($\lambda_{61} \ldots \lambda_{100}$) exhibiting 100 GHz spacing were multiplexed using $WGR_3$ and $WGR_4$, one for 32 of the channels and the other for 8 channels. The output from each of the four routers $WGR_1 \ldots WGR_4$ were combined using a 4×1 coupler. The channel wavelengths, as used in this exemplary arrangement, ranged from 1536.6 nm (Ch. 1) to 1560.2 nm (Ch. 60) in the C-band and from 1569.4 nm (ch. 61) to 1601.4 nm (Ch. 100) in the L-band. The laser sources included 24 DFB lasers and 76 external cavity lasers. The signals were all modulated at 10 Gbsec by a $LiNbO_3$ modulator 230 and then amplified by a wide-band optical amplifier 241. As used in this arrangement, a mid-section of the amplifier included a span of dispersion compensating fiber (DCF), exhibiting a dispersion of ~700 ps/nm at 1555 nm in both C and L section of the amplifier to decorrelate the channels. An attenuator/power meter 256 was added at the output end of the amplifier to control the power launched into the transmission span. Normally, the power launched into fiber spans was between 0 and 1 dBm per channel. Additional elements of our transmission arrangement include: polarization beam splitter 220, polarization controller 221, band pass filter 255, attenuator 256, and clock recovery circuit 259.

Figure 3:
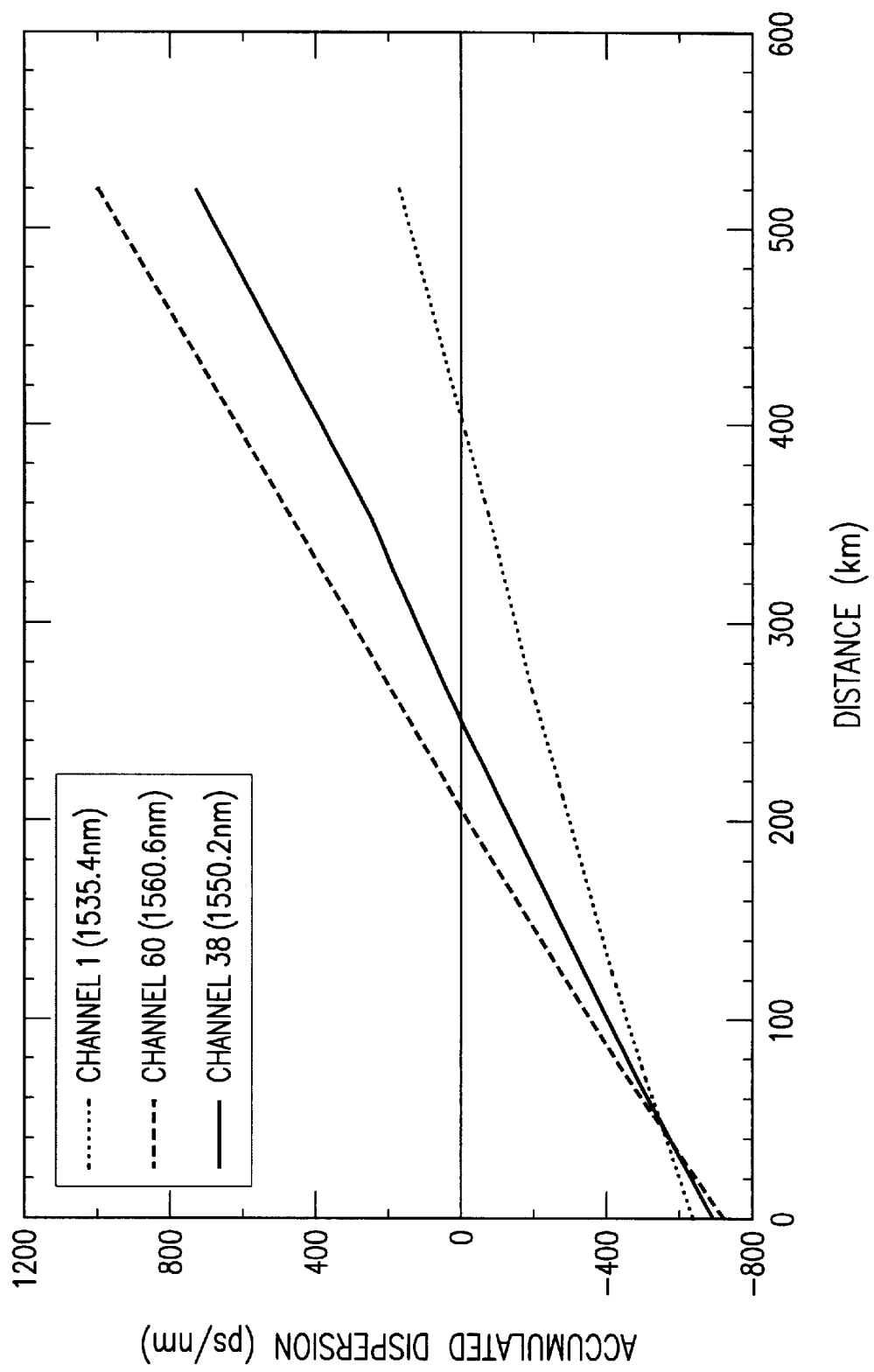
FIG. 3 is a graph showing the accumulated fiber dispersion vs. distance for our inventive arrangement.
Figure 4B:
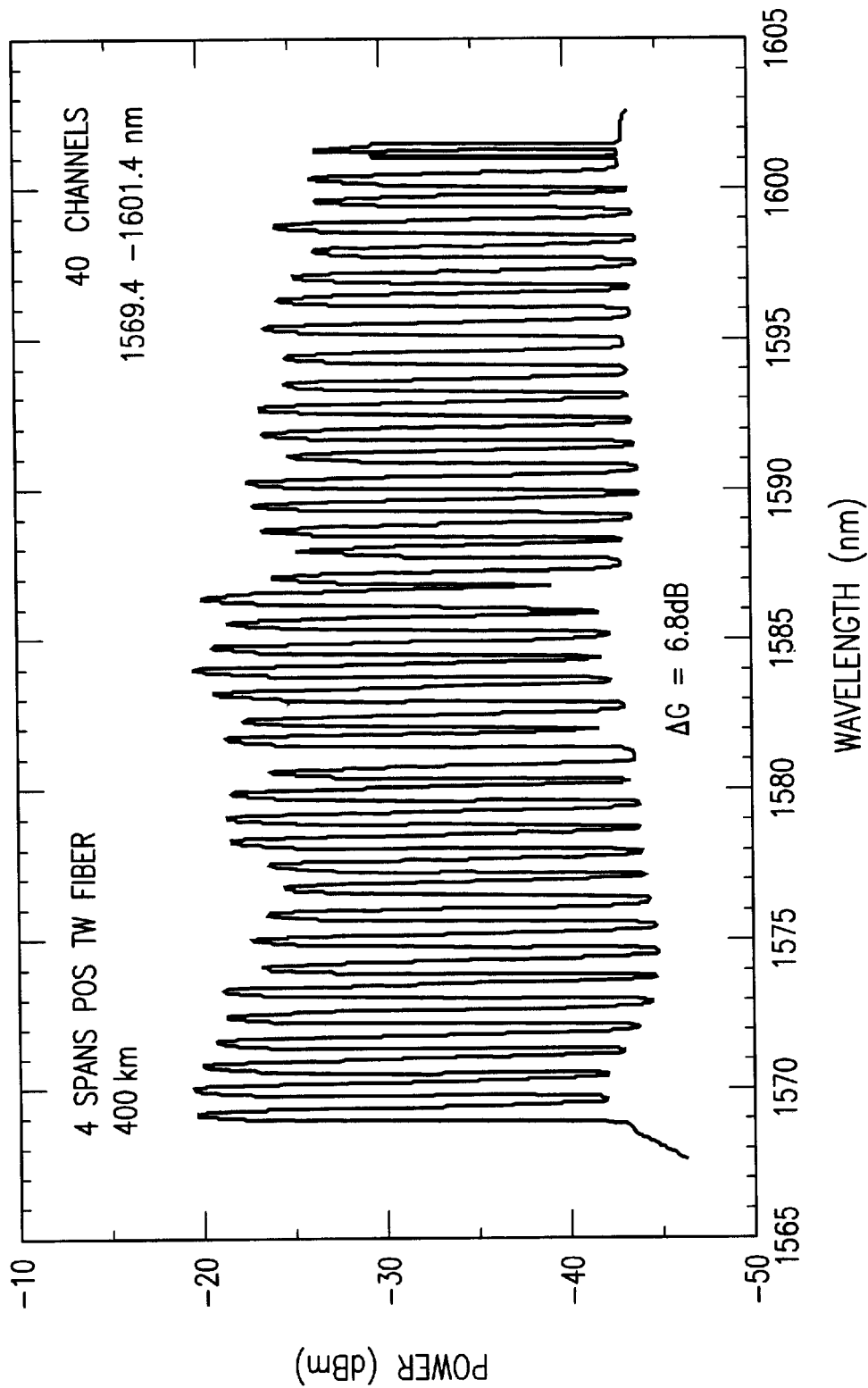
FIGS. 4(a) and (b) is a graph showing the power spectra for the C-and L-band, respectively.

The accumulated dispersion of the transmission span represented by our arrangement, consisted of six 85–105 km lengths of positive non-zero dispersion shifted fiber having a total length of 400 km is shown in FIG. 3 In the last wide-band amplifier situated within the transmission path, additional dispersion compensating fiber was added in both C (dispersion ~700 ps/nm at 1555 nm) and L (dispersion ~340 ps/nm at 1555) branches. This configuration results in a fiber span with low overall dispersion while maintaining finite local dispersion to reduce nonlinear effects. The positive TRUEWAVE fiber spans were chosen with a dispersion of 3 ps/nm-km at 1555 nm to reduce impairments due to the generation of four-wave mixing products. Zero dispersion wavelength of about 1510 nm was below the short-wavelength signals in the 1530 nm range. The optical spectra for C and L-bands immediately after 400 km is shown in FIGS. 4(*a*) and 4(*b*), respectively. The signal-to-noise ratio in a 0.1 nm bandwidth was greater than 35 dB after the first amplifier and remains greater than 23 dB after the fourth wide-band amplifier (not shown) in our arrangement. The variation in channel power after six wide-band amplifiers, was only 6.8 dB, or 7.4% of the total gain of 92 dB.

Figure 6:
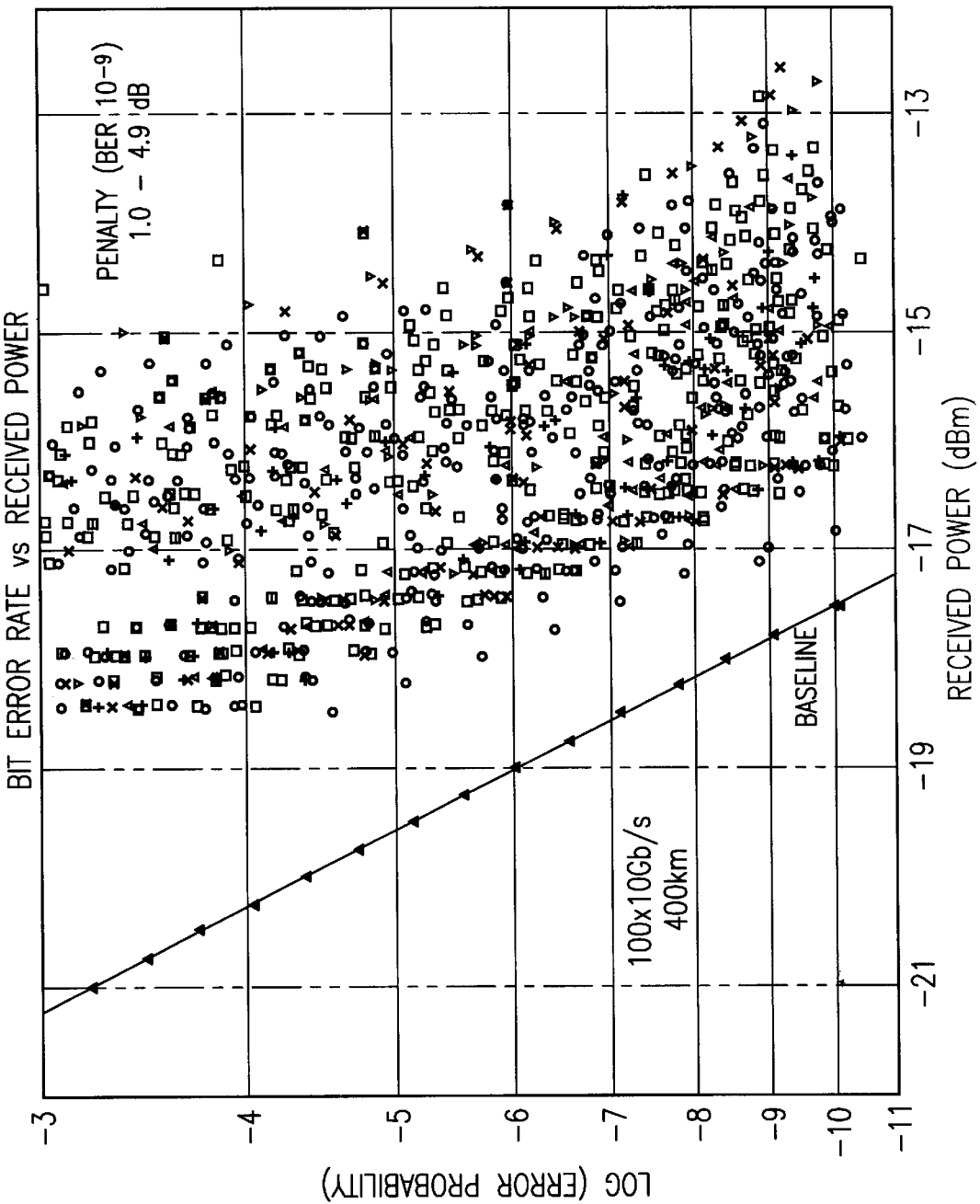
FIG. 6 is a graph of bit-error-rate (BER) for the 100 channels after transmission through our arrangement.

At the end of the transmission arrangement, signals were amplified by a wide-band amplifier 244 and demultiplexed with a tunable optical bandpass filter 255 having a 0.25 nm bandwidth. The signal was then detected by a p-i-n detector and split for clock extraction and data. The end of system eye diagram channels (channel x from C-band and channel y from L-band) are shown in FIG. 5. All are open, and as expected, exhibit little distortion due to chromatic dispersion. The resulting bit-error-rate (BER) curves for all 100 channels are shown in FIG. 6. All channels achieved error rates below $10^{-9}$.

For C-band channels, the power penalty at BER $10^{-9}$ was between 2.5 and 4.9 dB. The penalty maybe attributed to a combination of four-wave mixing, which is dominant at short wavelength channels (1–15) and cross phase-modulation effects. Small channel separation (50 GHz) enhanced these effects. The corresponding penalty of L-band channels was between 1.0 and 2.6 dB. Due to larger (100 Ghz) channel spacing, non-linear effects were less important in the L-band.

Various additional modifications of this invention will occur to those skilled in the art. In particular, different transmission lengths are contemplated. Nevertheless, all deviations from the specific teachings of this specification that basically rely upon the principles and their equivalents through which the art has been advanced are properly considered within the scope of the invention as described and claimed.

The invention claimed is:

1. A high-capacity optical transmission arrangement comprising:

a plurality of laser sources, each coupled to an individual optical waveguide;

a plurality of waveguide grating routers having an input section and an output section, the input section of each of the routers being coupled to selected ones of the individual optical waveguides and the output section of each of the routers being coupled to an individual output waveguide;

a coupler, coupled to the individual output waveguides from the waveguide grating routers, said coupler having an output waveguide; and a plurality of wide-band optical amplifiers optically connected in series, a first wide-band optical amplifier in communication with the output waveguide of the coupler, each one of said plurality of wide-band optical amplifiers including:

a common input section into which the optical signals arrive; and a split-section, in optical communication with the common section, the split section having a plurality of amplification branches wherein particular sub-bands of the optical signals traverse particular ones of the amplification branches in parallel.

2. The arrangement of claim 1, wherein each one of the plurality of wide-band optical amplifiers further comprises:

a splitter, interposed between the input section and the split-section, for splitting the optical signals into a plurality of sub-bands; and a combiner, in optical communication with the split-section, for combining the sub-bands into an output signal after they have traversed the particular amplification branches.

* * * * *